(12) United States Patent
Cooper (10) Patent No.: US 9,584,670 B2
(45) Date of Patent: Feb. 28, 2017

(54) METHOD AND APPARATUS FOR PROVIDING DATA AND TELEPHONY SERVICES

(71) Applicant: British Telecommunications Public Limited Company, London (GB)

(72) Inventor: Ian Robert Cooper, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/388,909

(22) PCT Filed: Mar. 25, 2013

(86) PCT No.: PCT/GB2013/000130
§ 371 (c)(1),
(2) Date: Sep. 29, 2014

(87) PCT Pub. No.: WO2013/144541
PCT Pub. Date: Oct. 3, 2013

(65) Prior Publication Data
US 2015/0085907 A1  Mar. 26, 2015

(30) Foreign Application Priority Data

Mar. 30, 2012  (EP) .................................... 12250087

(51) Int. Cl.
*H04M 11/06*  (2006.01)
(52) U.S. Cl.
CPC ........ *H04M 11/066* (2013.01); *H04M 11/062* (2013.01); *Y02B 60/36* (2013.01)
(58) Field of Classification Search
CPC ........ G06F 15/00; G06F 15/16; G06F 15/173; G11B 5/58; H04B 1/38; H04B 3/46;
(Continued)

(56) References Cited

U.S. PATENT DOCUMENTS 6,028,867 A * 2/2000 Rawson et al. ............... 370/463
6,061,392 A * 5/2000 Bremer ..................... H04J 1/12
370/468

(Continued)

FOREIGN PATENT DOCUMENTS

EP  1744514 A1  1/2007
EP  1998524 A1  12/2008

OTHER PUBLICATIONS

International Application No. PCT/GB2013/000130, Filed Mar. 25, 2013, International Search Report, mailed May 27, 2013, 3 pages.

*Primary Examiner* — Shawkat M Ali
(74) *Attorney, Agent, or Firm* — Patterson Thuente Pedersen, P.A.

(57) ABSTRACT

A digital subscriber line modem comprises a first part operable to operate in accordance with a high bandwidth Digital Subscriber Line protocol and a second part operable to operate in accordance with a low bandwidth Digital Subscriber Line protocol, wherein the second part is arranged to operate continuously whilst the first part is arranged to transition into a low power mode, in which less or no data is transmitted or received by the first part, when the demand for bandwidth over the connection falls below a predetermined amount. The modem additionally includes a router which controls the sending of data via the first and second parts as appropriate and controls the aggregation of data received via the two parts. The modem also includes a service splitter for passing signals received from a copper twisted pair forming a communications link via which the modem communicates with another modem to either the first part or the second part as appropriate based on the frequencies of the received signals.

9 Claims, 6 Drawing Sheets

(58) Field of Classification Search
CPC ....... H04J 1/16; H04J 3/06; H04J 3/14; H04L 5/16; H04L 12/26; H04L 12/28; H04L 12/50; H04L 12/66; H04L 27/28; H04W 4/00; H04M 11/062; H04M 11/066
USPC ....... 370/203, 225, 241, 248, 252, 255, 338, 370/360, 493, 509; 375/219, 220, 222, 375/257, 259, 260; 379/32.04; 702/189; 709/201, 224
See application file for complete search history.

(56) References Cited

U.S. PATENT DOCUMENTS

| | | | |
|---|---|---|---|
| 6,654,410 B2 | 11/2003 | Tzannes | |
| 7,061,987 B1* | 6/2006 | Tan | H04L 5/023 375/260 |
| 7,092,364 B1* | 8/2006 | Franklin | H04L 43/0852 370/252 |
| 7,266,109 B1* | 9/2007 | Rosenstein et al. | 370/352 |
| 8,036,293 B1 | 10/2011 | Kim | |
| 2001/0012319 A1* | 8/2001 | Foley | H04M 7/0069 375/222 |
| 2002/0018521 A1* | 2/2002 | Sherlock | H04M 11/062 375/222 |
| 2003/0101243 A1* | 5/2003 | Donahue | H04L 41/0806 709/220 |
| 2003/0123560 A1* | 7/2003 | Jacobsen et al. | 375/260 |
| 2006/0095581 A1* | 5/2006 | Ali | H04M 11/062 709/232 |
| 2006/0251115 A1* | 11/2006 | Haque | H04B 7/2606 370/466 |
| 2007/0109974 A1* | 5/2007 | Cutillo et al. | 370/254 |
| 2007/0263711 A1* | 11/2007 | Kramer et al. | 375/222 |
| 2008/0170609 A1* | 7/2008 | Heidari et al. | 375/222 |
| 2010/0254444 A1* | 10/2010 | Clausen | H04L 5/0042 375/220 |
| 2011/0019725 A1* | 1/2011 | Keller | H04L 5/0042 375/220 |
| 2011/0142206 A1* | 6/2011 | Jiang et al. | 379/32.04 |
| 2012/0263295 A1* | 10/2012 | Sanchez Yangula | H04M 11/062 379/416 |

\* cited by examiner

METHOD AND APPARATUS FOR PROVIDING DATA AND TELEPHONY SERVICES

RELATED APPLICATIONS

The present application is a National Phase entry of PCT Application No. PCT/GB2013/000130, filed Mar. 25, 2013, which claims priority to EP 12250087.9, filed Mar. 30, 2012, the contents of which are incorporated herein by reference in their entireties.

TECHNICAL FIELD

Embodiments relate to a method and apparatus for providing data and telephony services. In particular, embodiments relate to a method and apparatus for providing data and telephony services over an access network, at least the final part of which (i.e. the part closest to the subscribers' premises as opposed to the Local Exchange) is in the form of a copper pair over which a Digital Subscriber Line (DSL) connection is set up between a "Remote" DSL modem (referred to in ITU G993.2 VDSL2 standard as a VTU-R for VDSL Transceiver Unit-Remote) within the customer premises and a "Central Office" DSL modem (referred to in ITU G993.2 VDSL2 standard as a VTU-0 for VDSL Transceiver Unit-Central Office) located within a Digital Subscriber Line Access Multiplexor (DSLAM) (or a similar aggregation device containing network-side DSL modems). VDSL tends to be used over relatively short distances only and so is appropriate for use in network architectures in which the copper connect only extends over the final part of the access network—e.g. between a "street cabinet" and the customer's premises in a Fiber To The Cabinet (FTTC) arrangement

BACKGROUND

In order to increase bandwidth in data connections provided to subscribers of a telecommunications network operator, such operators are providing greater amounts of optical fiber connections in their access networks (e.g. as in an FTTC architecture). Generally speaking, the shorter the copper pair connection over which a signal is to be transmitted the greater the bandwidth that can be supplied over that connection (because as the connection reduces in length so the frequency at which signals can be successfully transmitted over that connection tends to increase). To take advantage of the higher frequency signals which can be transmitted over relatively short copper pair connections, higher bandwidth DSL standards have been developed. An important such standard is the Very-high-bit Digital Subscriber Line (VDSL) standard, the most up-to-date version of which is currently set out in the ITU standard G993.2 and is commonly referred to as VDSL2.

One feature which it would be desirable to include in this standard is a set of one or more low power modes. Such low power modes have already been introduced into the most recent Asynchronous DSL (ADSL) standard (see ITU G992.5—the ADSL 2+ standard). The aim of a low power mode is to enable a DSL connection to substantially reduce the amount of power required by the connection when no or very little data is being transmitted over the line, whilst enabling the connection to automatically and relatively quickly return to its normal high bandwidth mode whenever there is data for transmission over the connection. An ideal low power mode draws very little power when it is in the low power mode but can very quickly re-establish to the normal high bandwidth mode as soon as there is a demand for high bandwidth.

SUMMARY

In an embodiment, there is provided a digital subscriber line modem comprising a first part operable to operate in accordance with a high bandwidth Digital Subscriber Line protocol (such as, for example, a VDSL protocol such as that specified in G993.2) and a second part operable to operate in accordance with a low bandwidth Digital Subscriber Line protocol (such as, for example, a Single-pair High-speed Digital Subscriber Line (SHDSL) protocol, such as that specified in ITU G991.2), wherein the second part is arranged to operate continuously whilst the first part is arranged to switch off when the demand for bandwidth over the connection falls below a predetermined amount.

In an embodiment, the predetermined amount is an amount which can be provided by the second part. In this way the first part only needs to operate when bandwidth demand over the connection exceeds that which can be provided by the (advantageously) much lower power requirement of the second part.

In an embodiment, the second part is operable to provide at least one voice call connection, for example as a 64 kbps channel such as, for example, specified in ITU G.711. In this way a subscriber may be able to make and receive telephone calls even when the first part is switched off.

In an embodiment, the second part provides a synchronization signal to the first part when the first part "awakes" from sleep mode (i.e. when it is turned back on because of a new demand for bandwidth).

In an embodiment, the modem includes a master clock unit which controls the clock signals provided to both parts of the modem and which is kept in synchronization with another modem with which it is communicating at all times via the second parts even when the first parts are in a low power mode.

In an embodiment, the second part is used for carrying a channel containing signaling information which includes a "wake-up" indication when the first part is in a sleep mode, that the first part of the remote modem should wake up as the near-side modem has received a demand for bandwidth which cannot be supported by the second part alone.

In an embodiment, the time taken to "synchronize" the first parts of the communicating pair of modems is significantly reduced compared to the time that it would normally take to perform such synchronization in two conventional high-bandwidth DSL modems, by omitting various parts of the normal synchronization process. In some embodiments, the synchronization process can be eliminated altogether and the connection simply attempts to re-establish itself immediately based on connection parameters which have been kept updated and communicated between the modems using the connection between the second parts of the modems. It is likely that the connection will behave as though there had been a sudden glitch on the line (e.g. caused by a large noise event or a sudden change in the noise environment) but modems are designed to be able to cope with glitches of this kind up to a certain magnitude and so in many cases the connection will be viable despite the passing of time between the first parts of the modem entering and then leaving their sleep mode.

In one embodiment, during the sleep mode of the first parts of a pair of communicating modems, the channel between the first parts of the modem is kept open by transmitting predetermined dummy data which can be generated and sent over the transmission channel between the modem first parts with minimal processing required by at least the digital portion of the transmitting section of each first part of each modem. When transmitting dummy data in this way, in some embodiments it may be advantageous to (at least from time to time) have the receiving section of each of the first parts of the modems process the dummy data in the normal way in order to obtain the usual channel estimation measurements such that the operational parameters of the connection (between the first parts) can be kept up-to-date so that when the first parts switch out of their sleep mode they can resume communications over the channel with minimal disruption as the operational parameters are up-to-date.

In another embodiment, when the first parts enter into a sleep mode, the first parts are mostly switched off and no data is transmitted over the channel between the first parts (i.e. no signals (other than noise) are transmitted in the frequency band associated with the first parts). The clocks of the first parts are however kept (substantially) in synchronization with one another based on the clocks of the second parts (which are kept awake and in synchronization with one another). This can be done either by keeping the clocks going in the first parts or by re-starting the clocks in the first parts based on the clocks in the second parts where this is possible. In this embodiment it is likely that some form of synchronization will be required to bring the modems back into synchronization with one another (although this may not always be necessary and in some embodiments as a first attempt an attempt may be made to restart the connection immediately, and then to fall back into a full (or a reduced, modified) initialization phase if the connection is not sustainable. If the first parts are utilizing a (possibly seamless) rate adaptation protocol then a possible strategy may be to re-initiate the connection at a fairly un-ambitious rate and allow seamless rate adaptation to ramp the connection rate up over time (as described in, for example, U.S. Pat. No. 6,654,410).

In an embodiment, the first parts operate in a first frequency band and the second parts operate in a second frequency band, with very little overlap between the first and second frequency bands (in terms of power spectral density) and very little power transmitted outside of their respective frequency bands. In an embodiment, the second frequency band is maintained within a portion of an access network frequency plan allocation allocated to permit legacy telecommunications services such as ISDN (Integrated Services Digital Network) to operate and with a power spectral density which complies with such requirements (so as to avoid destructively interfering with other users who are using such legacy services on the access network in question).

Figure 1:
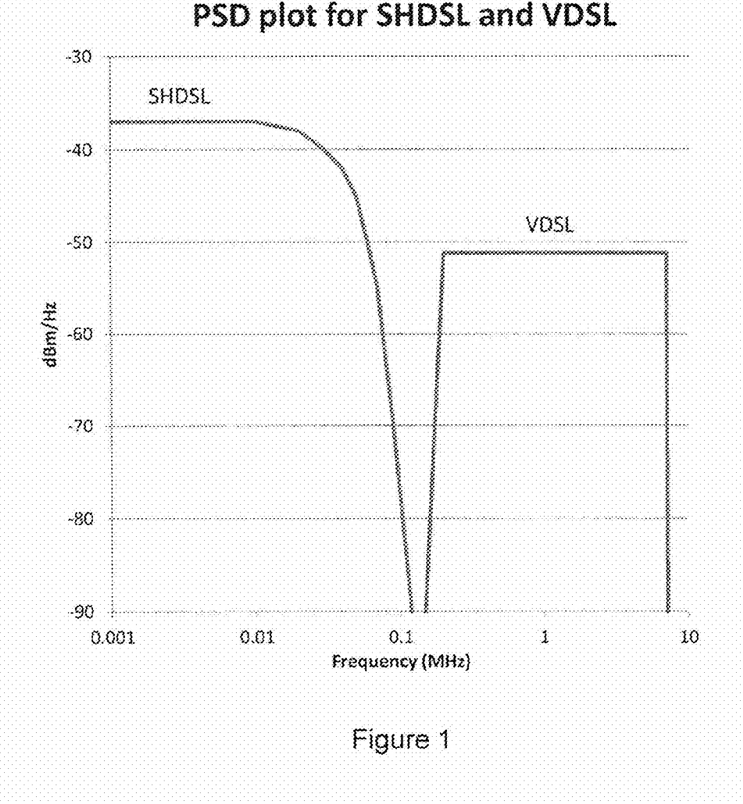
FIG. 1 is a schematic Power Spectral Density plot of a VDSL2 protocol and an SHDSL protocol.

For example, in the UK, the Access Network Frequency Plan produced by Ofcom specifies a PSD mask within which ISDN services should operate substantially as shown in FIG. 1. In some embodiments, the second part operates within this ISDN reserved PSD mask. In embodiments this is achieved by using an SHDSL protocol as discussed below.

In an embodiment, when used within the UK for example, the second part operates in accordance with an SHDSL protocol and the first part in accordance with a VDSL protocol. There is an advantage in using VIDSL rather than say ADSL for the first part since conventional since the cut-off frequency (above which VDSL signals may have a power in excess of −100dBm/Hz and below which SHDSL signals may have a in excess of −100 dBm/Hz) is 138 kHz and this would clash with conventional ADSL upstream (which goes down to 25kHz). Note also that the SHDSL should keep inside the basic-rate ISDN mask in embodiments and this therefore can only work up to approximately 1 Mbps. In sonic embodiments, SHDSL is only used up to 256 kbps so this comfortably fits inside the basic-rate ISDN mask—although this could be made variable depending upon conditions e.g. if a user rarely goes above 1 Mbps then attempt to keep all data on SHDSL and the first 10 (VDSL) parts can be switched off for most of the time, If a user frequently uses above 1 Mbps then give them a 256 kbps service and have the VDSL system operational for most of the time—this will limit the number of re-starts the VDSL system will need to make and hence may also limit the potential for glitches in the service.

Further embodiments relate to methods of operation of a modem and a method of controlling a modem and the manner in which data is provided to the modem for transmission over a copper pair connection between a pair of corresponding modems, where the modems are modems according to the first aspect of the present invention. Yet further embodiments relate to computer programs comprising processor implementable instructions for carrying out the methods and to carrier media, for example non-transient carrier media such as magnetic or optical storage media such as a hard-drive disk, CDs and DVDs, etc. as well as solid-state carrier media such as Solid State Drives (SSD's) USB thumb-drives, etc. when carrying such programs.

BRIEF DESCRIPTION OF THE DRAWINGS

In order that the present invention may be better understood, embodiments thereof will now be described, by way of example only, with reference to the accompanying drawings in which.

DESCRIPTION OF THE EMBODIMENTS

FIG. 1 illustrates the basic rationale behind various embodiments. By using two functionally separate modem technologies one operating at high frequencies and providing a high bandwidth connection and the other operating at lower (largely non-overlapping) frequencies and providing only a modest bandwidth connection the strengths of the two different modem technologies can be combined to provide a modem which can deliver high bandwidths when needed but can also drop into a power saving mode which provides some connection at all times and enables a fast wake up back to a high bandwidth mode when needed. FIG. 1 illustrates how suitable protocols for such a scheme are VDSL2 (as the high bandwidth (and correspondingly high power and high complexity) part) and SHDSL (as the low bandwidth (and correspondingly low power and low complexity) part). As can be seen in FIG. 1, the two PSD's of these two protocols are practically non-overlapping in that the mask drops to −100 dBm/Hz at 138 kHz for both protocols with power increasing for the VDSL2 protocol above this frequency and that for SHDSL increasing below that frequency.

Note that FIG. 1 illustrates with the blue left hand side low frequency mask, the PSD mask for SHDSL operating at approximately 1 Mbps. This is almost the same as the ISDN mask (although ISDN has a small kink in there as well). The motivation for constraining SHDSL to this rate is to allow it to be compatible with VDSL. It is possible to run SHDSL at higher rates (with associated higher QAM constellations) where the PSD mask extends considerably more than this.

Embodiments therefore combine VDSL2 and SHDSL to form a single DSL system where the SHDSL provides a constant low-bit-rate service and this is augmented by the high-rate. VDSL2 system only when required. The SHDSL carries a timing reference so that the remote VDSL2 modem can remain in synchronism whilst it is 'asleep' and also carries the VDSL2 SOC (Special Operation Channel) so that new messages including 'sleep' and 'awake' can be transmitted.

It is anticipated that future embodiments will provide a VDSL2 modem and SHQSL modem sharing the same silicon chipset(s). By comparison to VDSL2, SHDSL is a low complexity/low power technology and it is this technology which forms an 'always on low capacity channel'—say up to 1.2 Mbps (but advantageously up to 1 Mbps when attempting to keep the PSD envelope of the SHDSL signals within the basic-rate ISDN PSD mask) but when greater capacity is required a VDSL2 channel becomes operational which carries the excess data. A by-product of embodiments is that this single chipset can be used as a ubiquitous delivery system where the SHDSL provides a long-range low capacity link and the VDSL2 provides higher capacity over shorter range. In some cases VDSL2 operation will not be possible over long line due to range issues—however the SHDSL will work and thus a ubiquitous solution can be provided using a single chipset/solution. The SHDSL and VDSL2 systems are frequency domain duplexed, i.e. the SHDSL occupies the lower portion of the spectrum (from de to 138 kHz) and the VDSL2 operates from 138 kHz to 7 Mhz or 17 MHz (or even up to 30 MHz according to the latest UK Access Network Frequency Plan—naturally this could conceivably also be further extended over time). Note that voice may be transmitted as one or more G.711 64 kbps channels within the SHDSL stream (like ISDN) as it is not possible to transmit analogue POTS and G.SHDSL simultaneously. Of course, voice could also be transmitted as a SIP based service within the general broadband data payload.

Figure 2:
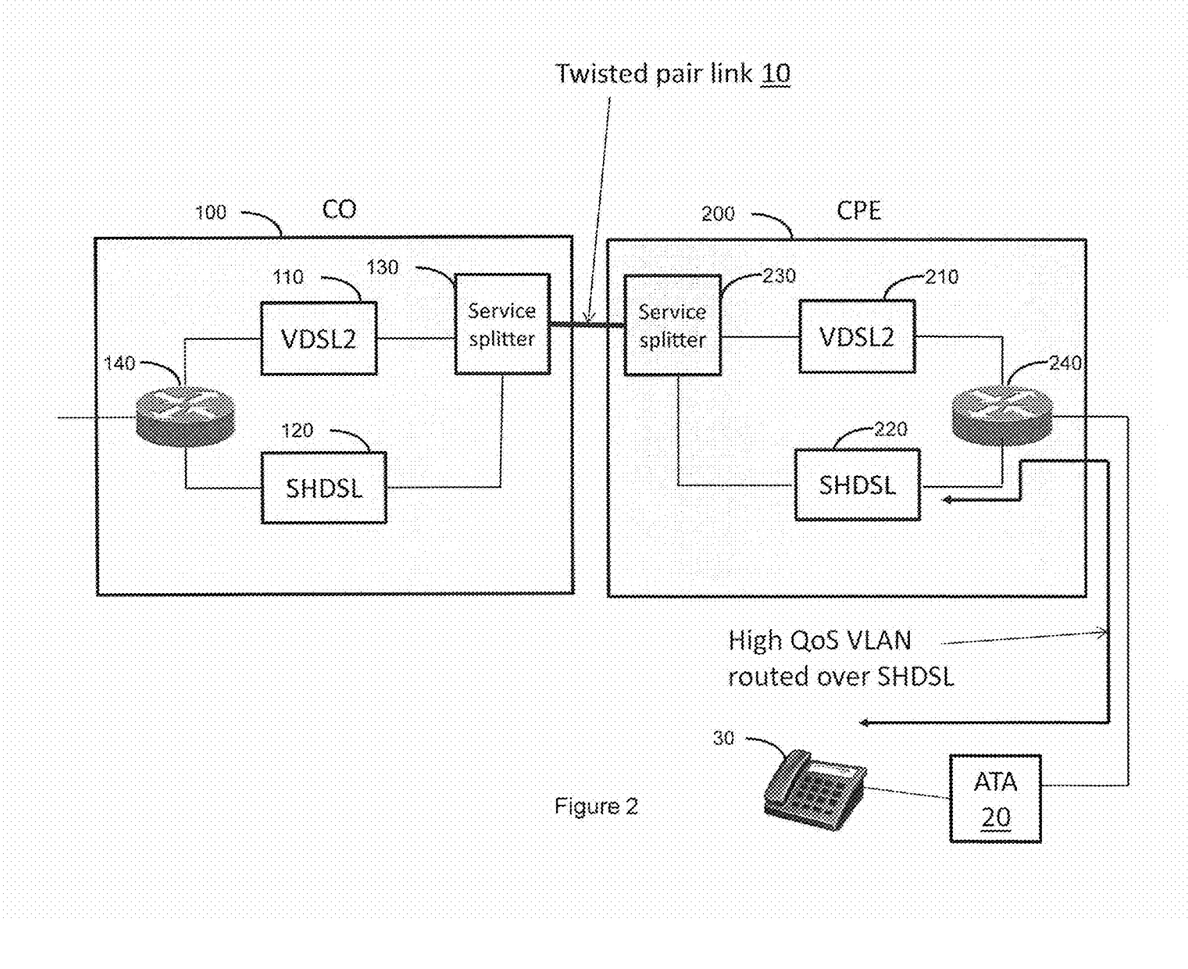
FIG. 2 is a schematic block diagram of a system comprising two modem devices according to an embodiment connected together over a copper pair link.

FIG. 2 illustrates in overview a system according to embodiments comprising a pair of modems 100, 200 (also according to embodiments) connected together via a copper pair 10 (e.g. a twisted copper pair 10); the customer premises or remote side modem 200 is connected via an Analogue Telephone Adapter (ATA) 20 to a telephone apparatus 30 located at the customer's premises. As shown, each modem 100, 200 (often referred to in DSL terminology as a transceiver unit) comprises a first part 110, 210 (in this case a VDSL2 part), a second part 120, 220 (in this case an SHDSL part), a service splitter 130, 230 and a router part 140, 240.

In overview, the system operates as follows. The router 140, 240 includes intelligence which determines whether or not the first parts 110, 210 of the modems 100, 200 are required based on incoming demand for bandwidth. If the router 140, 240 determines that the short term demand for bandwidth is insufficient to justify use of the first parts 110, 210 (e.g. based on the rate of fill of a buffer (and possibly the current degree of fill of the buffer) within the router 140, 240 and/or based on indications received from the communicating modem 200, 100, and possibly also on observed historic trends or other such intelligence, or simply based on a certain low demand period having elapsed, etc.) then the router will route all of data to/from the second part 120, 220 and the first part 110, 210 will be instructed to enter or remain in a low power sleep mode (note generally no explicit instruction is required to maintain the first part in a sleep mode, rather an explicit instruction is required to transition it from a sleep mode to an awake mode or vice versa). If, on the other hand, the router 140, 240 determines that the first part is either immediately required for transmission or reception purposes, or that it will be shortly, then it is instructed to wake up (if asleep) or to remain awake (e.g. by failing to send an explicit instruction to enter a sleep mode) and then a (non-zero) portion of all data to be transmitted over the link 10 is sent via the first part (with either some or zero data being sent via the second part). Naturally, before sending more data than the first part can itself buffer before sending, the router may wait until the first part is in a position to successfully transmit all of the data which it needs to send over the link 10.

The service splitter 130, 230 is responsible for combining data to be transmitted over the connection 10 in a frequency multiplexed manner arriving from the first 110 and second parts into a single signal for transmission over the connection 10 and for demultiplexing data received from the connection 10 and passing the data destined for the first part to the first part and the data destined for the second part to the second part based on the frequencies of the received signals.

The Analogue Telephone Adapter (ATA) 20 is responsible for converting between VOIP signals suitable for transmission/reception by the second part from/into signals suitable for use by a conventional analogue telephone as is well known in the art of telephony.

Figure 3:
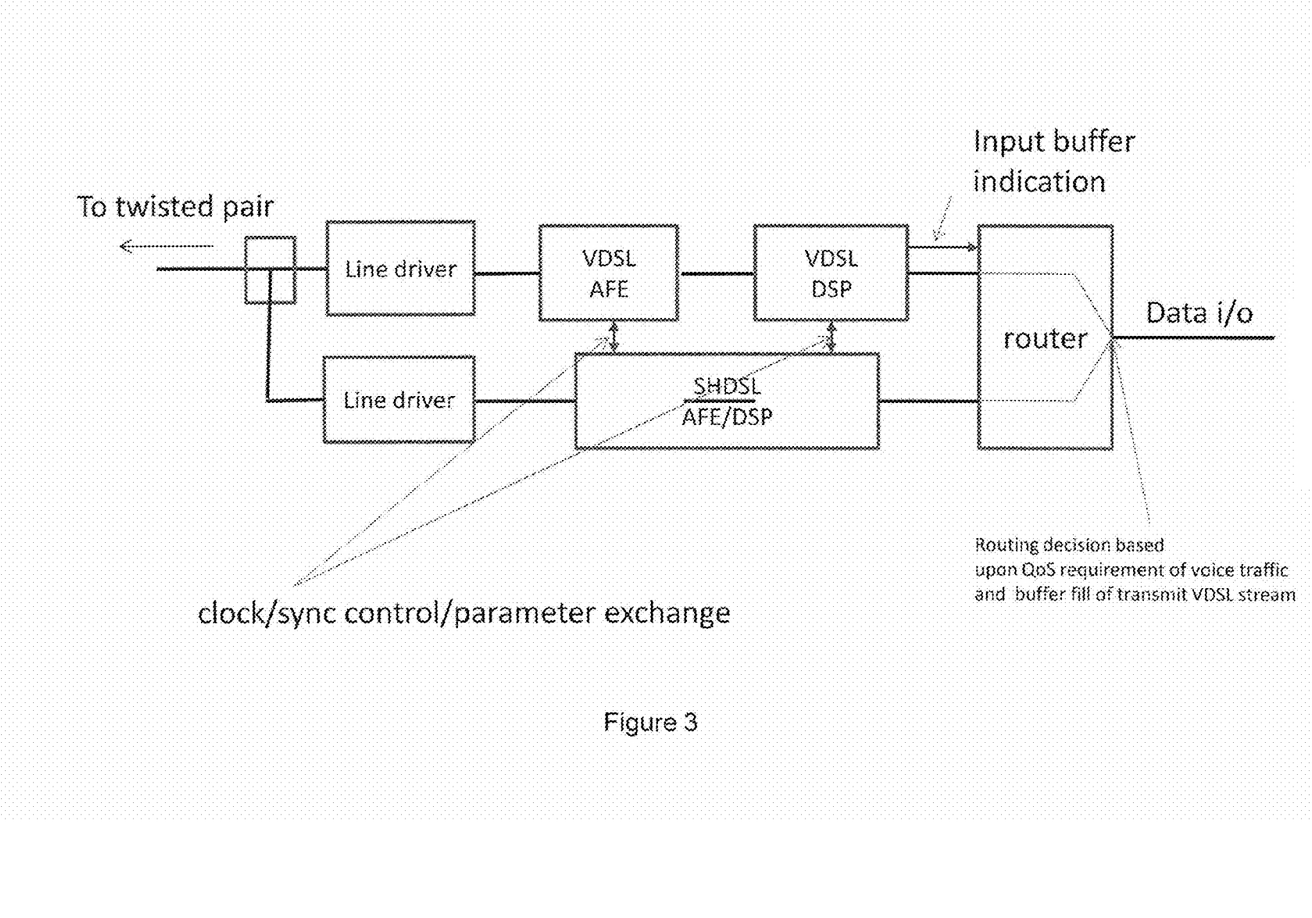
FIG. 3 is a schematic block diagram showing one of the modems of FIG. 2 in more detail.

FIG. 3 shows the modem 200 in a little more detail. In particular, it shows that the VDSL2 part 210 is comprised of a Digital Signal Processor (DSP) sub-part 212, an Analogue Front End (AFE) sub-part 214 and a line driver 216; similarly it shows how the SHDSL part 220 is formed of an AFE/DSP sub-part 222 and an associated line driver 226. FIG. 3 also illustrates how clock signals, sync control signals and/or parameters may be exchanged between the SHDSL AFE/DSP sub-part 222 and the VDSL AFE sub-part 214 and the VDSL DSP sub-part 212. The output from the line drivers 216, 226 is passed to the service splitter 230 which combines the signals together for co-transmission over the twisted copper pair link 10.

Note that in the present embodiment the VDSL and SHDSL parts each have their own line driver 216 and 226 respectively. However, in alternative embodiments, a single wideband line driver could be used which is optimized for amplifying signals right across the combined frequency band used by both the SHDSL and the VDSL parts. In order to receive incoming signals from the twisted copper pair channel 10, In the VDSL case the upstream and downstream are frequency division duplexed (FDD) so there is an internal filter prior to the line driver 216 which by-passes the received signal straight towards the receiver within the VDSL AFE sub-part 214. In the case of SHDSL—this uses echo cancellation and thus the same spectrum is used for both transmit and receive. Therefore the relationship between transmitter and receiver within the SHDSL AFE/DSP sub-part is more complex. The service splitter 230 will nonetheless filter out all VDSL signals from the copper pair 10 so only transmitted and received SHDSL signals are input to the SHDSL AFE/DSP sub-part 222. Because SHDSL does not use FDD as between upstream and downstream signals there may be some minor complications in using a single line driver for all transmissions but it is certainly feasible.

FIG. 3 additionally illustrates how the VDSL DSP sub-part 212 includes a buffer, the state of which (i.e. an indication of how full the buffer is) is provided to the router 240 to be used by the router in determining how to route incoming data (i.e. data received from the CPE side to be transmitted to the CO modem 100 over the copper pair 10). Different strategies which may be employed by the router in different embodiments in order to route data between the VDSL and SHDSL parts 210, 220 are discussed below.

Figure 4:
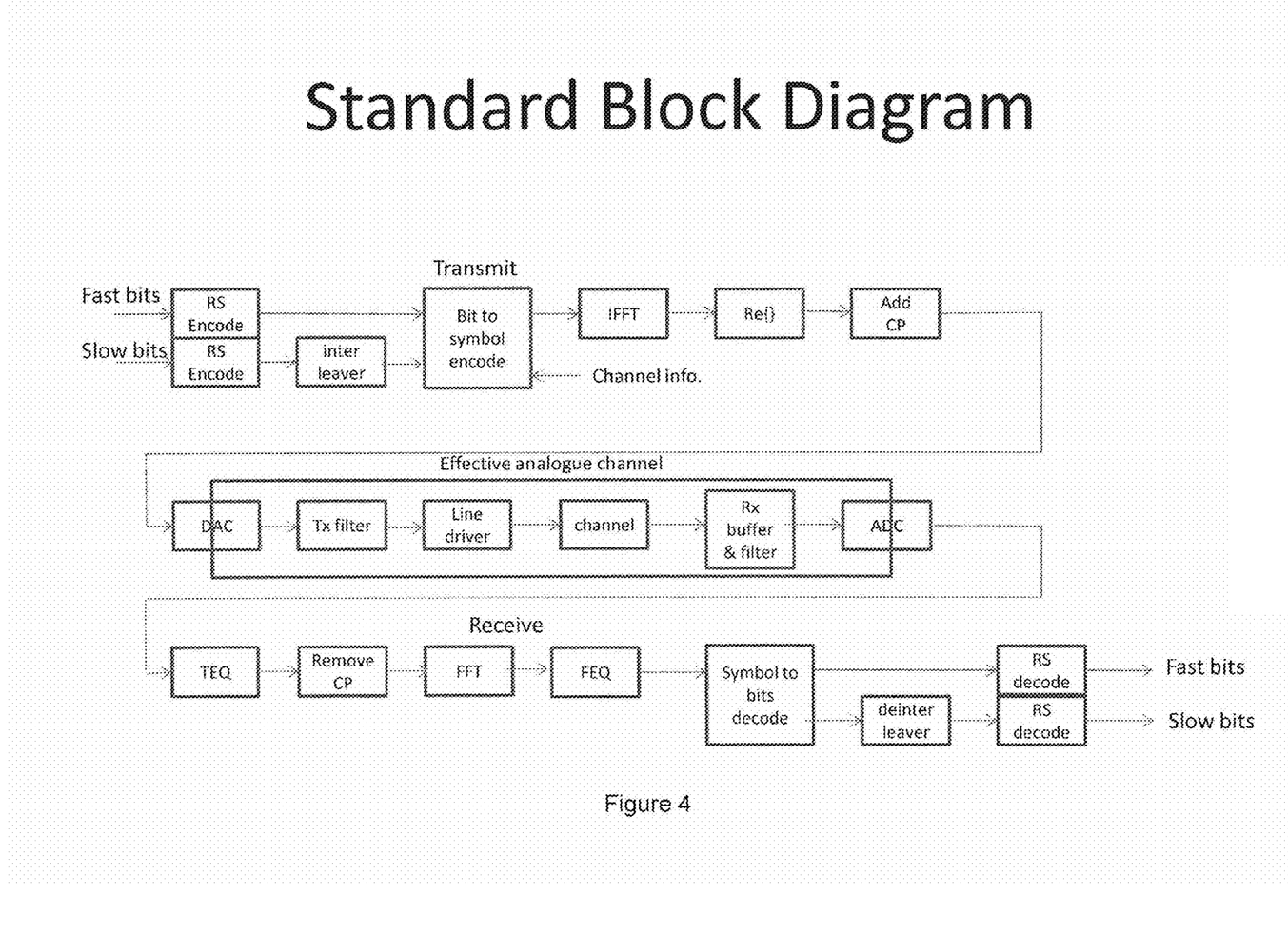
FIG. 4 is a functional block diagram of a conventional VDSL2 modem.

FIG. 4 illustrates the conventional functions performed by a conventional prior art VDSL2 (or VDSL1) modem. As shown, the diagram only considers elements between and including the addition of Reed-Solomon protection to bits to be transmitted over the channel 10. The various functions are set out and briefly discussed below:

Fast & Slow bits & interleaving: The VDSL modem permits a so called FAST and SLOW channel through two parallel framers, each implementing Forward Error Correction (FEC). Because of its latency, the interleaved framer is referred to as the "slow" buffer, and the non-interleaved framer is called the "fast" buffer. The incoming bits to fast and slow buffers are then Reed Solomon (RS) encoded by functions 405 and 406 respectively to generate RS encoded bits. The RS encoded slow bits are then interleaved by an interleaver function 410 to introduce robustness to bursty noise.

Bit to Symbol Encode function 415: RS encoded bits (and interleaved for slow bits) are divided up among frequency bins by capacity & mapped to appropriate Quadrature Amplitude Modulation (QAM) constellations. The bit capacity & QAM size of each frequency bin is based upon channel Signal to Noise Ratio (SNR) determinations made based on quiet line measurements made during modem training.

IFFT function 420 and Re{ } function 425: The complex N-Length frequency vector (made up of N QAM constellations) is Inverse Fast Fourier Transformed (IFFT'd) to produce a 2N-length time domain signal. The real part of the output of the IFFT function 420 is obtained by function 425 and passed on to the next function.

Add Cyclic Prefix (CP) function 430: A cyclic prefix is added to the transmit vector such that when the vector is convolved with the channel, the convolution is cyclic. This is helpful for frequency equalization in the receiver.

Digital to Analog Conversion (DAC) function 435: the digital transmit vector is then converted into an analogue signal for further processing in the analogue domain.

Transmit Filter Function 440: This filters the analog signal output by the DAC to remove noise and to keep the analog signal within the PSD mask required for the transmission.

Line Driver function 445: This function simply amplifies the signal to be transmitted for transmission over the channel. An important point to note for purposes of embodiments is that in a VDSL modem the power consumed by the line driver function is much less than the power consumed by the DSP part in performing the various digital domain functions 405 to 430, in particular the IFFT function 420.

Channel 10: This marks the boundary between transmit functions and receive functions—note that each modem includes a corresponding transmit section and a receive section.

RX Buffer and Filter 455: Signals received from the channel 10 are firstly buffered and then filtered to remove as much unwanted signal as possible. In a conventional VDSL modem the upstream and downstream transmissions are FDD'ed and so transmissions coming from the transmission part of a modem can be largely filtered out of the received signals coming from the other modem.

Analog to Digital Conversion (ADC) function 460: This function converts the received and filtered signal back into the digital domain for further processing as a digital signal.

Time domain EQualization (TEQ) function 465: There are two forms of equalization that occur in a VDSL modem transceiver. After the received analogue signal has been digitized, it is first modified by a TEQ function 465 followed by Frequency domain EQualization (FEQ) function 480, which is applied after a Fast Fourier Transform (FFT) function 475. The purpose of TEQ 465 is to "shorten" the effective channel length such that it falls within the cyclic prefix length. It also prevents inter-symbol interference.

Remove Cyclic Prefix function 470: The CP is no longer necessary prior to the FFT function 475.

FFT 475: This function transforms the time domain data vector into a vector of QAM symbols.

Frequency Equalization (FEQ) function 480: This function applies an inverted frequency-domain approximation of the channel response to the received data vector. The CP & TEQ validate the assumption of cyclic convolution with the channel.

Symbol to Bits decode function 485: This function maps QAM symbols back to bits.

Deinterleaver function 490: This function performs de-interleaving of the interleaved transmitted bits from the slow channel.

RS decode functions 495, 496: These functions decode the RS encoded fast and slow bits respectively to attempt to recover the bits originally transmitted by the transmit section of the other modem.

Figure 5:
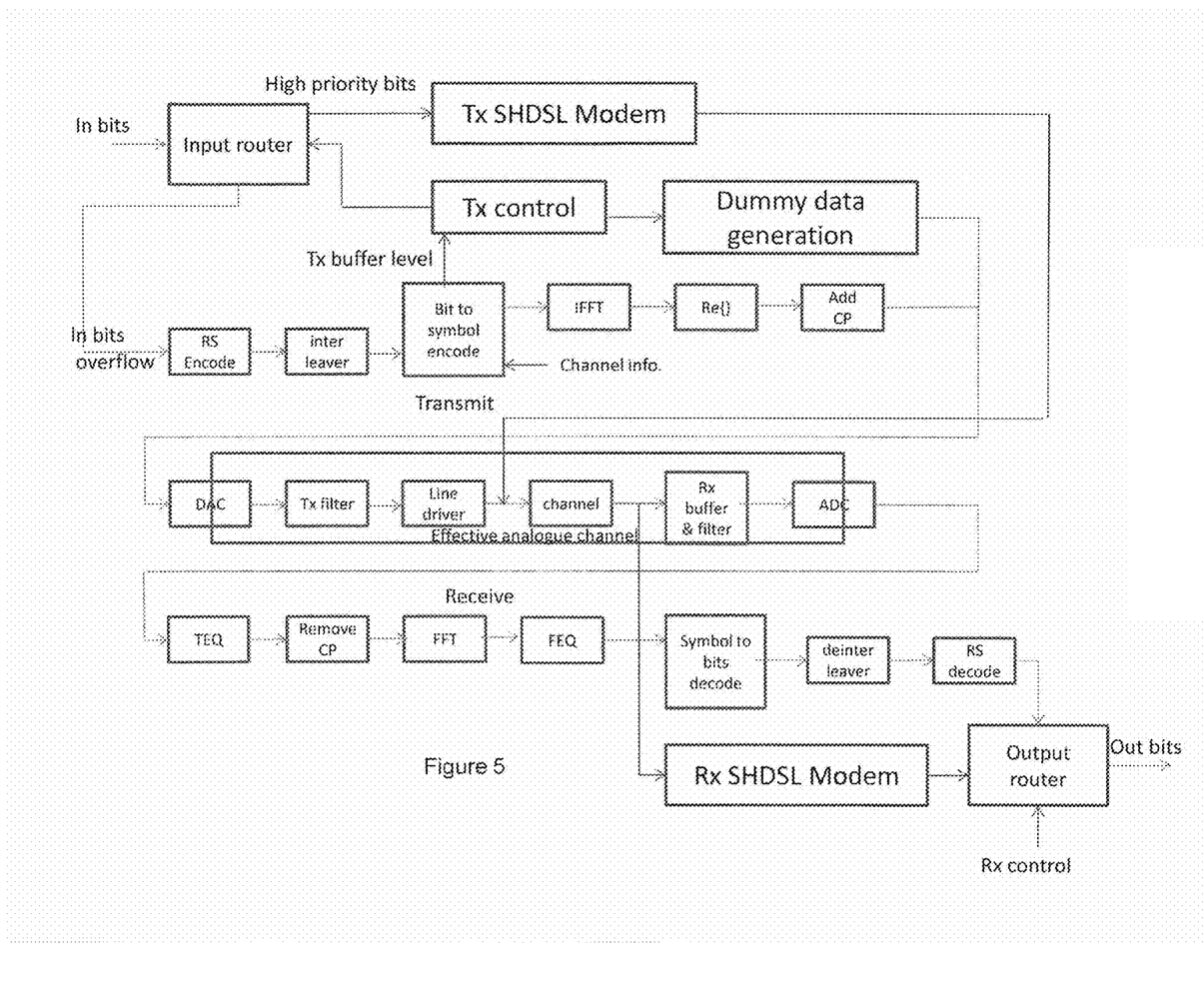
FIG. 5 is a functional block diagram similar to that of FIG. 4 but illustrating the functional components of the high bandwidth (VDSL2) part of the modem of FIG. 3 in accordance with a first embodiment.

FIG. 5 is similar to FIG. 4 in that it illustrates the functions performed by a modem, but this time it illustrates the functions performed by the modems 100, 200 according to a first embodiment. Functions which are conventional and have already been described above with reference to FIG. 4 have been designated with the same reference numeral as in FIG. 4 and will only be commented on again if there is some significance for the present embodiment.

In overview, FIG. 5 shows (for data being transmitted from the CPE modem 200 to the CO modem 100) that the incoming bitstream goes into a routing part 241 of the router 240 which divides this into two basic streams—the 'high priority' stream and the 'overflow stream.' The high priority traffic goes via the SHDSL part 220 whilst the overflow stream goes via the VDSL part 110 (which in this embodiment is reduced to a single latency system for simplicity as there is less need for a FAST low latency channel via the VDSL route since the SHDSL link can provide a low latency link). The routing part is controlled by a transmit control module 242 (forming the rest of the router 240 in the present embodiment) which receives an indication of the transmit buffer level from the bits to symbol encoding function 415 of the VDSL part. For example, the transmit control module may control the routing part to route all incoming data via the SHDSL modem 220 whilst the rate of receipt of incoming data is below a certain threshold. When the incoming bits are below the predetermined threshold referred to above such that no incoming bits are being passed to the VDSL part, the transmit control module 242 controls the IFFT, Re{ } and Add CP functions 420, 425 and 430 to be switched off and it controls a dummy generator module 432 to generate dummy data which is passed straight to the AFE 214 of the VDSL part 210 (specifically to the DAC function 435 thereof). When the transmit buffer is above a certain threshold then the data travels via both paths (and the dummy data is not inserted). By switching off the IFFT, Re{ } and Add CP functions 420, 425 and 430 in the VDSL transmit path considerable power can be saved and hence this can be considered as a low power mode.

On the receive side of things the SHDSL stream carries the control information for the Output Router 140. This router 140 combines the two streams—but recognizes the dummy data (in some embodiments this could be coordinated so the dummy data is recognized via a particular header that is inserted on the transmit side). Also on the receive side there is of course no need to perform the FFT on the dummy data—but for reasons of performance, in the present embodiment the receiver continues processing this data in the normal manner so that the channel characteristics are still analyzed as normal, i.e. the channel information can still be accurately fed back to the transmitter so that the channel information (and corresponding operational parameters such as bit loading parameters etc.) are kept up to date as the channel changes over time. Alternative embodiments could however perform much reduced processing on the receive side as well whilst still keeping the channel info reasonably up to date, etc.

It should be noted that although only transmission of data in one direction is illustrated in these figures that of course each modem has a transmit and a receive part with functions as illustrated for the other modem.

It should also be noted that in the present embodiment the transmit control module is considered as forming part of the router 240. Of course this function could be performed elsewhere in alternative embodiments. For example it could be more closely integrated into the DSP part of the VDSL modem together with the dummy data generation. The main benefit of using dummy data is that we can avoid performing the power costly IFFT function 420 and we can instead simply use predetermined dummy data obtained from a look up table for example. In keeping with this idea, different kinds of dummy data could be used to form a crude signaling channel to the other (receiving) modem. For example, the need for the remote modem to "wake up" and start processing the data and sending it to the output router 140 could be indicated by a change in the dummy data being sent, etc.

Note that in the embodiment illustrated in FIG. 5 and as described above, when only the IFFT, Re{ } and Add CP functions are being turned off in the transmit side of the VDSL modem parts, the modem achieves on a relatively modest power saving but can almost instantaneously revert to high bandwidth data transmission when needed and can also equally quickly fall into this lower power mode when the extra bandwidth over and above that which can be supplied by the SHDSL part is not needed. This therefore represents a very "light sleep" mode. In general, by switching off more portions of the VDSL modem parts it will be possible using the general architecture of FIG. 5 to achieve deeper sleeps which require more time to ramp up and down from and to but which achieve greater power savings when in the deeper sleep modes. For example, by only intermittently processing received dummy data channel estimations can be made which are less than perfect and have more latency associated with them but extra power can be saved, etc.

Figure 6:
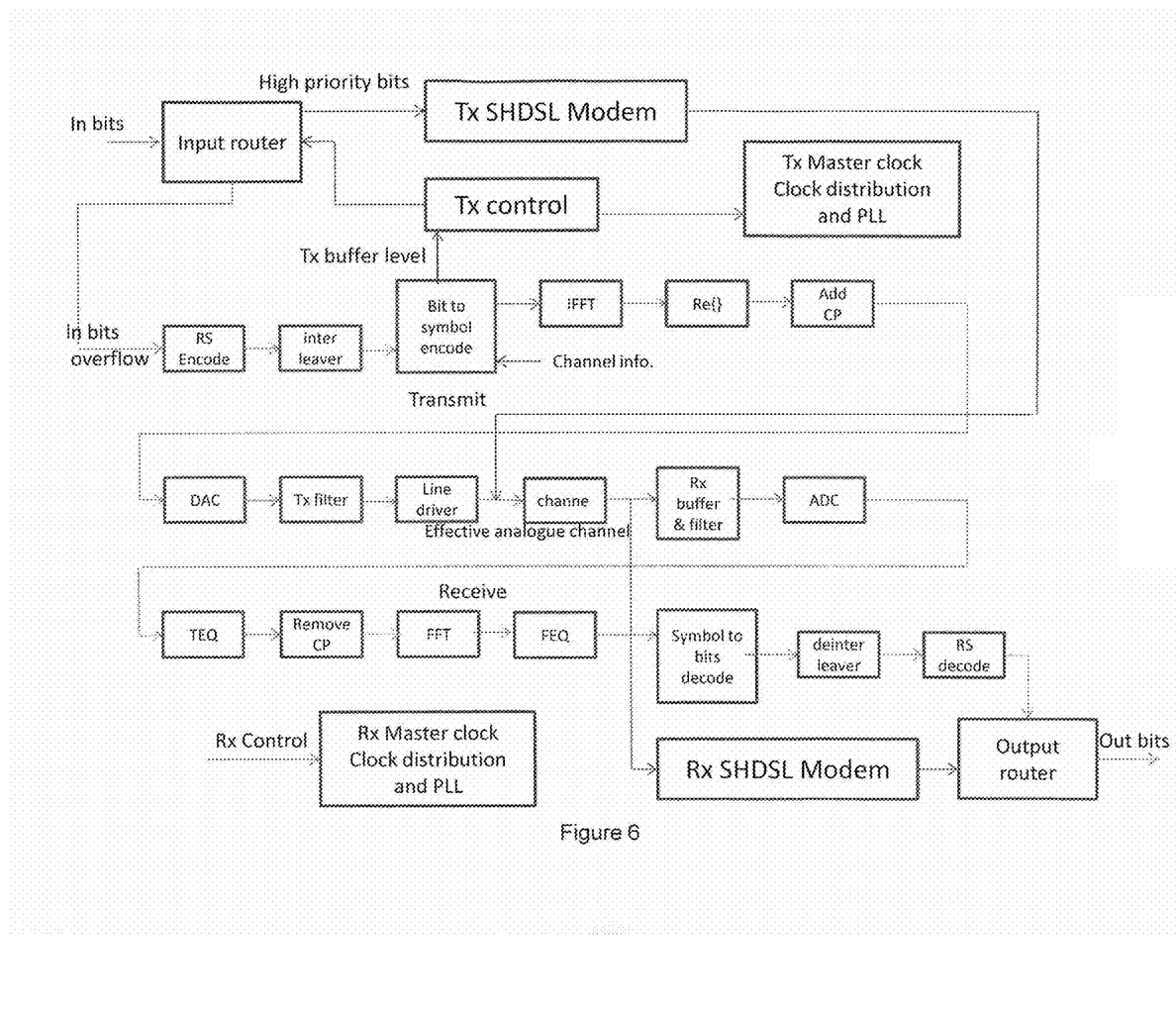
FIG. 6 is a functional block diagram similar to that of FIGS. 4 and 5 but illustrating the functional components of the high bandwidth (VDSL2) part of the modem of FIG. 3 but accordance with a second embodiment.

FIG. 6 illustrates a second embodiment which sets out a slightly different approach in which greater power savings can be achieved but at the cost of it taking longer to ramp the VDSL part back to full high bandwidth operation. In other words it provides a deeper sleep mode compared to the embodiment of FIG. 5.

Note that in this embodiment, the transmit control module 250 is illustrated as being separated from the router 240. As discussed above, the location of the transmit control functionality is not key to the working of embodiments.

FIG. 6 shows that there is a Master Clock 260 on the transmit side which delivers the correct clock frequencies to all of the transmit silicon devices (both SHDSL and VDSL)—these are all derived from the single Master Clock 260. When it is detected that the required data rate is low, i.e. the input transmit buffer is low (as reported, in the present embodiment, by the bit to symbol encode function 415), then the clock to the orange color sections of the digital part of the VDSL (the IFFT function 420, the Re{ } function 425, the Add CP function 430) and the clock (and in some embodiments for the following analog functions also the power to these functions which is particularly significant for analog functions), to the analog DAC function 435, the Tx Filter function 440 and the line driver 445 can be switched off (this is all controlled by the clock distribution circuit). Simultaneously the receive side circuitry can also have its clock (and for analog functions the power as well in some embodiments) removed (the boxes colored red, namely the Rx buffer & Filter function 455, the AOC function 460, the TEO function 465, the Remove CP function 470, the FFT function 475, the FEQ function 480, the Symbol to bits decode function 485, the Deinterleaver 490 and the RS decode function 496—in other words almost the entirety of the VDSL part on both the receive and the transmit side). When these functions are switched off or deprived of a clock signal, the Master clocks on both the transmit and receive sides are kept in close synchronization with one another via the SHDSL channel. In the present embodiment, this is performed by transmitting a control signal via the SHDSL route (the Rx Control signal which is shown as controlling the receive side Master Clock and clock distribution and PLL unit 160).

What is left operating when in this deep sleep mode is the SHDSL system working normally and most of the VDSL clocks turned off (and hence they are burning much less power).

Then when the Tx input buffer shows that more capacity is required the VDSL clocks are turned back on (on both the Tx and Rx sides) and hopefully (without too much of a disturbance) data begins to flow over the VDSL part of the system in parallel with the SHDSL. If the channel information has become too out of date during the deep sleep, then it may not be possible to instantly re-establish a connection over the VDSL channel, but in this case the modems can use conventional techniques for re-establishing the connection. In the present embodiment, when the connection fails to re-establish based on the operational parameters as in use when the modems went into their deep sleep mode, a fast resynch is performed in which a very low rate connection is established using only a small selection of low frequency tones (or bins) with—low bit loading per bin and then a conventional dynamic rate adaptation process is used to ramp the rate up to a more normal high bandwidth rate over a period of a few super frames. Alternatively, (or if all else fails) the VDSL parts can resort to a conventional complete resynchronization process. There is no need to have any control on the Output Router this time since this does not have to discard the Dummy Data transmitted using the previous method.

Of course both ends of the channel would have a Tx and Rx part—what has been shown in this diagram (and the previous one) is just the downstream data path. There is of course and upstream data path—but this is identical (but reversed) to the downstream path shown.

By attempting to re-establish the connection using the operational parameters in use at the time the modems went to sleep, the likely result is that if the modems have been in a sleep mode for only a relatively short period of time they will resynchronize at a high rate relatively quickly whereas if they have been in a sleep mode for a long time they will take longer to ramp back up to full high bandwidth mode. This behavior however is likely to be acceptable to end users who are probably more inclined to suffer a delay in their system ramping up to full bandwidth if their connection has been idle for a long time, whereas if the line has only been idle for a short period of time—they would begrudge any delays much more. The present embodiment achieves this naturally acceptable behavior whilst still achieving very good power savings when in sleep/mode.

Naturally a third embodiment could be formed which comprises a combination of the embodiments of FIGS. 5 and 6. In such a case, the router (or some other control module such as the transmit control module 250) could implement a strategy in which the modem is instantly put into a light sleep whenever the data rate falls below the predetermined threshold of data supportable by the SHDSL link, but the modems are only placed into a deeper sleep in which most of the VDSL parts are essentially turned off or unclocked only when the connection has been idle or at least below the threshold for more than a predetermined amount of time.

The invention claimed is:

1. A first digital subscriber line modem operable to communicate with a second digital subscriber line modem via a copper pair connection, the first modem comprising:
   a first high bandwidth Digital Subscriber Line modem part and a second low bandwidth Digital Subscriber Line modem part,
   wherein the second modem part is arranged to operate continuously providing a low bandwidth connection whilst the first modem part is arranged to operate, simultaneously with the second modem part, sequentially in both a high power mode in which the first modem part provides a high bandwidth connection to the second modem and a low power mode, in which less or no data is transmitted or received by the first modem part, wherein the first modem part is arranged to transition from the high power mode to the low power mode when a demand for bandwidth over the connection falls below a predetermined amount, and wherein the second modem part continues to operate providing the low bandwidth connection continuously before and after such a transition.

2. A first digital subscriber line modem according to claim 1 wherein the predetermined amount of demand for bandwidth is an amount which can be provided by the second modem part.

3. A first digital subscriber line modem according to claim 1 wherein the second modem part is operable to provide at least one voice call connection.

4. A first digital subscriber line modem according to claim 1, further comprising a master clock unit which controls clock signals provided to the first modem part and the second modem part of the first modem and which is kept in synchronization with the second modem with which the master clock unit is communicating at all times via the second modem part even when the first modem part is in the low power mode.

5. A first digital subscriber line modem according to claim 1 wherein the second modem part is used for carrying a channel containing signaling information which includes a "wake-up" indication when the first modem part is in a sleep mode, that the first modem part of a remote modem should wake up as a near-side modem has received a demand for bandwidth which cannot be supported by the second modem part alone.

6. A method of controlling a first modem having a first modem part and a second modem part, the first modem being in communication with a second modem via a copper pair connection, the method comprising:
   operating the second modem part continuously at a low bandwidth rate whilst the first modem part is operating, simultaneously with the second modem part, sequentially in both a high power mode in which the first modem part can provide a high bandwidth connection to the second modem and a low power mode, in which less or no data is transmitted or received by the first modem part, wherein the first modem part is arranged to transition from the high power mode to the low power mode in dependence upon the demand for bandwidth over the connection, and wherein the second modem part continues to operate providing a low bandwidth connection continuously before and after such a transition.

7. A method according to claim 6 wherein a voice connection is provided between the first and second modems via the second modem part.

8. A method according to claim 6 wherein high priority data is transmitted via the second modem part and the first modem part transmits and receives data with a higher latency than via the second modem part.

9. Non-transitory carrier means carrying processor implementable instructions for causing a first modem to operate in accordance with a method of controlling the first modem having a first modem part and a second modem part, the first modem being in communication with a second modem via a copper pair connection, the method comprising:
   operating the second modem part continuously at a low bandwidth rate whilst the first modem part is operating, simultaneously with the second modem part, sequentially in both a high power mode in which the first modem part can provide a high bandwidth connection to the second modem and a low power mode, in which less or no data is transmitted or received by the first modem part, wherein the first modem part is arranged to transition from the high power mode to the low power mode in dependence upon the demand for bandwidth over the connection, and wherein the second modem part continues to operate providing a low bandwidth connection continuously before and after such a transition.

* * * * *